(12) United States Patent
Droste et al.

(10) Patent No.: US 9,321,594 B2
(45) Date of Patent: Apr. 26, 2016

(54) ACTUATING UNIT FOR AN APPARATUS FOR SORTING ARTICLES

(71) Applicant: Interroll Holding AG, Sant' Antonino (CH)

(72) Inventors: Heinrich Droste, Sinsheim (DE); Thomas Bertran, Schwarzbach (DE); Uwe Kaeser, Mudau (DE)

(73) Assignee: Interroll Holding AG (CH)

( * ) Notice: Subject to any disclaimer, the term of this patent is extended or adjusted under 35 U.S.C. 154(b) by 92 days.

(21) Appl. No.: 14/130,189

(22) PCT Filed: May 17, 2013

(86) PCT No.: PCT/EP2013/001479
§ 371 (c)(1),
(2) Date: Dec. 30, 2013

(87) PCT Pub. No.: WO2013/174500
PCT Pub. Date: Nov. 28, 2013

(65) Prior Publication Data
US 2014/0131175 A1 May 15, 2014

(30) Foreign Application Priority Data

May 21, 2012 (DE) .......................... 10 2012 010 056

(51) Int. Cl.
*B65G 17/34* (2006.01)
*B65G 47/96* (2006.01)

(52) U.S. Cl.
CPC .............. *B65G 17/34* (2013.01); *B65G 17/345* (2013.01); *B65G 47/96* (2013.01); *B65G 2201/02* (2013.01); *B65G 2207/18* (2013.01); *Y10T 29/49826* (2015.01)

(58) Field of Classification Search
None
See application file for complete search history.

(56) References Cited

U.S. PATENT DOCUMENTS

| 3,231,066 A | 1/1966 | Harrison et al. |
| 4,722,430 A * | 2/1988 | Canziani .............. B65G 47/962 105/271 |

(Continued)

FOREIGN PATENT DOCUMENTS

| DE | 697 19 044 | 12/2003 |
| DE | 600 08 747 | 2/2005 |
| EP | 0 930 248 | 7/1999 |

OTHER PUBLICATIONS

International Search Report dated Aug. 6, 2013.

(Continued)

*Primary Examiner* — Kavel Singh
(74) *Attorney, Agent, or Firm* — Gerald E. Hespos; Michael J. Porco; Matthew T. Hespos

(57) ABSTRACT

An actuating unit (50) for a sorting device (10), the actuating unit (50) comprising a flap holder (60) and at least one flap (80, 80') having a drive component (81, 81') for transmitting a drive force to a drive wheel (32) of a transport unit (18), the flap (80, 80') being displaceably mounted in the flap holder (60) between a resting position and a drive position, a movement limiting component (82) being provided on the flap (80, 80'), said movement limiting component cooperating with a movement limiting element (63), such that the displacement movement of the flap (80, 80') is limited in the direction of the resting position and/or in the direction of the drive position. Sorting device (10) having such an actuating unit (50) and method for mounting such an actuating unit (50).

20 Claims, 9 Drawing Sheets

(56) References Cited

U.S. PATENT DOCUMENTS

| | | | | |
|---|---|---|---|---|
| 5,489,017 A | * | 2/1996 | Bonnet | B65G 17/345 |
| | | | | 105/30 |
| 5,657,858 A | | 8/1997 | Van Den Goor | |
| 5,662,206 A | * | 9/1997 | Baum | B65G 47/962 |
| | | | | 198/370.04 |
| 2004/0079618 A1 | | 4/2004 | Abildgaard et al. | |

OTHER PUBLICATIONS

German Examination Report dated Apr. 10, 2013.

Chinese Patent Appl. No. 20130082111X—Office Action issued on Jan. 12, 2015.

* cited by examiner

ACTUATING UNIT FOR AN APPARATUS FOR SORTING ARTICLES

BACKGROUND

1. Field of the Invention

The invention relates to an actuating unit for a sorting device as well as a sorting device for sorting articles having at least one such actuating unit, as well as a method for mounting such an actuating unit.

2. Description of the Related Art

Sorting devices for sorting articles are known. Such sorting devices for sorting articles may comprise a plurality of ejection stations which are arranged in succession along a sorting line. Sorting devices may also comprise a conveying device via which successive transport units are guided and driven. Each of the transport units may comprise a belt conveyor which is able to be driven transversely to the sorting line. Articles may be transferred to the individual transport units at a feeding station. The articles may then be ejected from the transport units via a specific drive of the belt conveyor at one of the ejection stations. To this end, it is disclosed in EP 0 930 248 B1 that the drive of the belt conveyors of the transport units in the ejection stations may be implemented purely by mechanical drive means and that first drive means corresponding to second drive means of the transport units are arranged in each case in the region of the ejection station. The first drive means and the second drive means may optionally be brought into contact when a transport unit passes an ejection station.

Proceeding from the aforementioned prior art, the object underlying the present application is to provide an actuating unit for a sorting device, a sorting device for sorting articles having at least one such actuating unit, as well as a method for mounting such an actuating unit which ensures improved operational safety and which is able to be easily produced.

SUMMARY OF THE INVENTION

A first independent feature for solving the object relates to an actuating unit for a sorting device, the actuating unit comprising a flap holder and at least one flap having a drive component, the flap being displaceably mounted in the flap holder between a resting position and a drive position, and a movement limiting component being provided on the flap, said movement limiting component cooperating with a movement limiting element, such that the displacement movement of the flap is limited in the direction of the resting position and/or in the direction of the drive position.

The drive component serves for transmitting a drive force to a drive wheel of a transport unit when the flap is in a working position. The drive component may be configured as a friction surface so that a frictional force may be transmitted to the drive wheel. In a further embodiment, the drive component may have a toothing which may be brought into contact with a drive wheel configured as a toothed wheel. The flap holder may also be denoted as a flap frame. The movement limiting element may be provided on the flap holder and/or may be a component of the flap holder. The actuating unit may comprise two flaps. The actuating unit may comprise actuating means, such as for example pneumatic actuators or the like which displace the flap(s) between the resting position and the drive position. The movement limiting component and the movement limiting element are provided in addition to such actuating means in order to achieve additional security.

This design has the advantage that in the case of the failure of a component, such as for example a pneumatic actuator, a screw connection or a damping element, the displacement movement of the flap is limited. The flap, therefore, is not able to fall into the interference contour of the transport unit or the drive chain. Such a limitation may prevent a displacement beyond a predetermined maximum displacement so that a collision of the flap with other components of the sorting device in motion during operation of the sorting device, such as for example the transport units, may be prevented. The risk of a crash or a system failure may therefore be reduced.

One embodiment relates to the above-described actuating unit, both the drive component and the movement limiting component being an integral component of the flap.

'Integral component' means that the flap together with the drive component and the movement limiting component form a one-piece component. It is possible for a one-piece component to have been produced from one workpiece.

A further embodiment relates to one of the above-described actuating units, the flap being produced as a bent sheet metal part.

In this embodiment, the flap together with the drive component and the movement limiting component may be bent from a single piece of sheet metal. This has the advantage that a connection of individual parts by welding is dispensed with. Thus greater production accuracy may be achieved as welding distortion is eliminated.

A further embodiment relates to one of the above-described actuating units, the movement limiting component being configured as a projection on the flap and the movement limiting element being formed by configuring a recess corresponding to the projection.

The projection may have an elongate shape, in particular a tongue-shaped design. The movement limiting component configured as a projection is able to protrude into the recess. When displaced in the direction of the drive position, at the end of the displacement movement, the movement limiting component is able to come into contact with a first edge region of the recess, so that the displacement movement of the flap is limited in the direction of the drive position. Additionally or alternatively to the first edge region, the recess may have a second edge region. When displaced in the direction of the resting position, at the end of the displacement movement, the movement limiting component is able to come into contact with the second edge region of the recess, so that the displacement movement of the flap is limited in the direction of the resting position.

A further embodiment relates to one of the above-described actuating units, the flap holder being configured as a bent sheet metal part.

The flap holder may be bent from a single piece of sheet metal. This has the advantage that a connection of individual parts by welding is dispensed with. Thus greater production accuracy may be achieved as welding distortion is eliminated.

A further embodiment relates to one of the above-described actuating units, the flap holder having a recess corresponding to the movement limiting component and the movement limiting element being formed by the recess.

The movement limiting component may be received in the recess such that a movement of the movement limiting component is limited by the above-described first and second edge region of the recess. As the movement limiting component may be an integral component of the flap, by limiting the possibility of movement of the movement limiting component the displacement of the flap is also limited at the same time. The recess may be formed in the single piece of sheet metal from which the flap holder is produced.

A further embodiment relates to one of the above-described actuating units, an axle element being fastened to the flap and the flap being pivotably mounted via the axle element in the flap holder.

In this case, the displacement movement of the flap may be described as a pivoting movement about the central point of the axle element.

The axle element may extend between two bent-back tabs of the flap, in particular between two tabs of the flap bent-back at right angles. The tabs may be an integral component of the flap. In particular, the tabs may form part of the single piece of sheet metal from which the flap holder is produced. The tabs may have receiving holes through which the axle element may be inserted. In this case, the axle element on both sides of the tabs may protrude beyond the tabs. The axle element may be fixedly connected to the flap, in particular screwed, bonded, pressed or welded. Alternatively, the axle element may be fixed only in the axial direction and rotatably received in receiving holes of the flap via a loose fit. An axial fixing of the axle element in the holes may be implemented in any manner, for example via circlips.

Depending on whether the axle element is fixedly connected to the flap or fixedly connected to the flap holder, this may contribute to the bracing of the flap and/or the flap holder.

A further embodiment relates to one of the above-described actuating units, the axle element being received in bearings of the flap holder, at least one of the bearings being formed by a U-shaped recess which is open on one side.

For example, two bearings may be provided for each flap, both of said bearings being open on the same side. This has the advantage that such a flap may be inserted together with the axle element as a pre-assembled sub-assembly in the bearings. Rapid access to the components is ensured, in particular access to actuating means and/or damping elements which may be subjected to a certain degree of wear. Maintenance is thus simplified. The U-shaped recesses of the bearings may be upwardly open so that it is possible to mount and dismantle the flaps or the entire flap sub-assemblies in the fully mounted sorting device. In this case, it is possible for the flap holder to be initially mounted in the sorting device during assembly. Subsequently, the flaps or the flap sub-assemblies may be inserted into the mounted flap holder.

The flap may be secured in the bearings against slipping out. The securing may be implemented by a screw connection. To this end a nut, for example, may be screwed to an external thread of the axle element. The axle element may have a projection so that the bearings of the flap holder may be clamped between the projection and a nut. In this case, the axle element is fixed both in the axial direction and in the peripheral direction relative to the flap holder. The projection may be configured in one piece on the axle element or as a separate projection element which may be fixedly connected to the axle element, in particular screwed, bonded, pressed or welded. A displacement of the flap may take place in this case by rotating the flap relative to the axle element. When the axle element has two projections, it may be screwed to two bearings. In this case, the axle element may serve for bracing the flap holder. In the case of a flap holder with two flaps, the bracing provided by both axle elements is added together.

A further embodiment relates to one of the above-described actuating units, the actuating unit also comprising an actuating means which is connected at a first end of the actuating means to the flap and which is connected at a second end of the actuating means to the flap holder, a damping element being arranged between the first end of the actuating means and the flap and/or between the second end of the actuating means and the flap holder.

Such a damping element may consist of a material which comprises a resilient plastics, in particular an elastomer. The actuating means may, for example, be formed by a pneumatic actuator, in particular a pneumatic cylinder. If only one damping element is arranged on one side of the actuating means, the actuating means may be fastened on the other side via an articulated connection, for example via a ball joint, to the adjacent component. The effect of damping elements is that the shock load of the actuating means is reduced, which may result in increased protection against malfunction due to an extension of the life of the actuating means. Moreover, a reduction in noise may be achieved by means of the damping elements.

A further embodiment relates to one of the above-described actuating units, the fastening of the actuating means via the damping element providing an articulated connection which ensures a resilient pivoting of the actuating means relative to the flap or the flap holder.

Such a damping element serves not only for shock absorption but at the same time undertakes the function of an articulated joint. In this case, a pivoting of the actuating means relative to the flap or the flap holder by at least 1° or by at least 2° or by at least 3° may be ensured.

A second independent feature for solving the object relates to a sorting device comprising an actuating unit according to an embodiment of an actuating unit described in relation to the first independent feature.

An embodiment of such a sorting device relates to a sorting device, the U-shaped recesses of the bearings of the flap holder being upwardly open in the mounted position of the flap holder in the sorting device.

In this manner, it is possible to mount and dismantle the flaps or entire flap sub-assemblies in the fully assembled sorting device in a simple manner.

The descriptions of the embodiments of the first or third feature made above or below also apply to each of the embodiments described relative to the second feature.

A third independent feature for solving the object relates to a method for mounting an actuating unit according to the first feature, comprising the steps providing a flap holder with upwardly open bearings,
providing a pre-assembled flap sub-assembly comprising a flap, an axle element and an actuating means,
inserting the pre-assembled flap sub-assembly into the flap holder, the axle element being inserted into the upwardly open bearings, and
fixing the axle element into the upwardly open bearings and fixing the damping element to the flap holder.

The method steps may take place in the cited sequence.

The method may also comprise the method step of pre-assembling the flap sub-assembly which takes place before the insertion of the flap sub-assembly. Moreover, the mounting procedure may comprise the step of fastening the flap holder in the sorting device, said step being able to take place before the insertion of the pre-assembled flap sub-assembly in the flap holder. The pre-assembled flap sub-assembly may also comprise a damping element.

For each of the embodiments of the mounting procedure described with regard to the third feature, the above descriptions of the embodiments of the first or second feature also apply.

Individual embodiments for solving the object are described by way of example hereinafter with reference to the figures. In this case, to some extent the individually described embodiments have features which are not absolutely necessary in order to implement the claimed subject of the invention but which provide properties which are desired in specific applications. Thus embodiments which do not have all features of the embodiments described hereinafter are to be regarded as disclosed, falling under the described technical teaching. Moreover, in order to avoid unnecessary repetition, specific features are only mentioned with regard to individual embodiments described hereinafter. It should be mentioned that the individual embodiments are not, therefore, intended to be considered simply per se but also to be considered together. By considering said embodiments together, the person skilled in the art will recognise that individual embodiments may also be modified by incorporating individual features or a plurality of features from other embodiments. It should be mentioned that a systematic combination of the individual embodiments with individual features or a plurality of features, which are described with reference to other embodiments, may be desirable and expedient and therefore taken into consideration and also intended to be regarded as encompassed by the description.

BRIEF DESCRIPTION OF THE DRAWINGS

FIG. 7b shows an enlarged partial view of FIG. 7a.

DETAILED DESCRIPTION OF THE PREFERRED EMBODIMENTS

Figure 1:
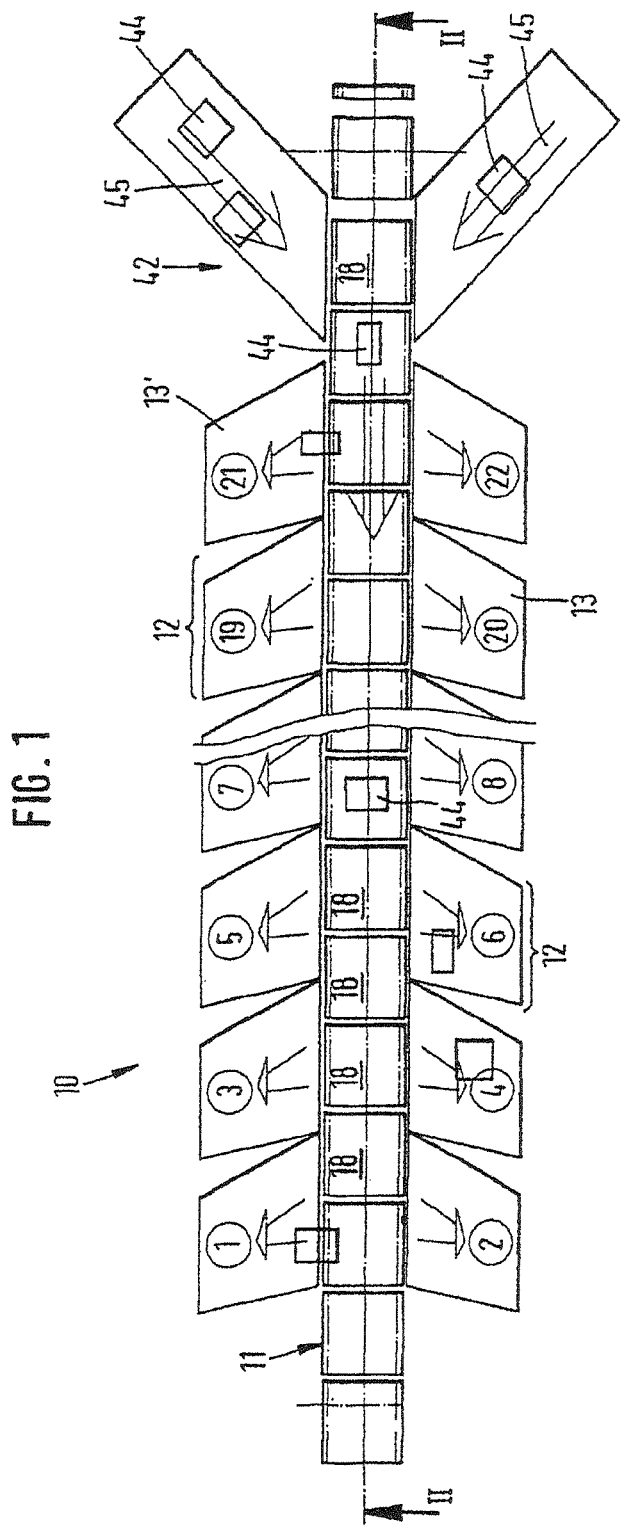
FIG. 1 shows a plan view of a sorting device in which in each case successive ejection stations and ejection slides are arranged on both sides along a sorting line.
Figure 2:
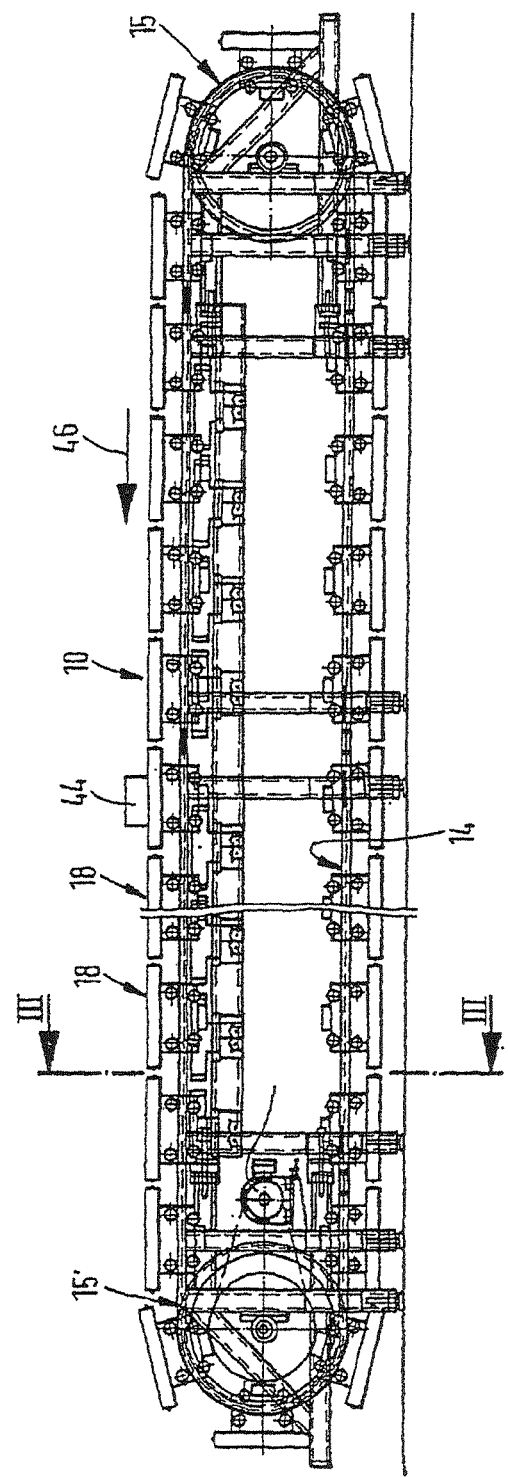
FIG. 2 shows a longitudinal section corresponding to the cutting line II-II in FIG. 1 through the sorting device, with transport units which are also arranged in succession guided along the sorting line.

FIGS. 1 to 5 show a known mechanically actuated sorting device for illustrating the mode of operation of such a sorting device.

The sorting device 10 illustrated in said drawings for sorting articles comprises an elongated sorting line 11.

Successive ejection stations 12 are arranged along the sorting line 11, said ejection stations comprising lateral ejection slides 13, 13'. The sorting device 10 further comprises a conveying device 14 with deflection rollers 15, 15'. A V-belt 16 circulates around the deflection rollers 15, 15'. The V-belt is configured as an endless conveying means. Successive transport units 18 are coupled to the V-belt 16.

Guide rails 19, 19' are arranged adjacent to the transport units 18. The transport units 18 are driven via guide rollers which act on the guide rails 19, 19', via the V-belt and along the guide rails 19, 19' and at the same time guided over the guide rollers.

In this case the transport units 18 may be provided in each case on both sides with two sets of three pairs of guide rollers 20, 20' arranged spaced apart from one another in the direction of conveyance. As a result, an accurate longitudinal guidance of the transport units 18 is ensured. In a further embodiment, a further arrangement of the guide rollers may be provided. An exemplary further embodiment is shown, for example, in FIG. 6.

The deflection rollers 15, 15' are arranged at both ends of the sorting line. The guided V-belt 16 runs in a vertical plane around the deflection rollers 15, 15'. The transport units 18 coupled to the V-belt 16 are deflected in the region of the deflection rollers and run back below the sorting line. Guide rails 19, 19' may also be arranged below the sorting line, as shown, so that a guidance of the transport units 18 is also ensured below the sorting line. The guide rails 19, 19' running on both sides of the sorting line may be connected together in each case via curved elements in the region of the deflection rollers 15, 15'.

The V-belt 16 of the conveying device 14 may be driven by means of an electric motor 21 connected to one of the deflection rollers via a further belt drive. Further drive variants are also conceivable, for example via a drive of the deflection rollers.

Each transport unit 18 has at least one carriage 22. A carriage 22 may comprise at least one belt conveyor 24 which is able to be driven transversely to the longitudinal direction of the sorting line 11. The belt conveyors 24 of the transport units 18 may be guided via deflection rollers 25, 25' with pivot pins extending in the direction of travel of the V-belt 16. The drive of the belt conveyors 24 may be implemented via a friction roller or a plurality of friction rollers 26, 26'. Such friction rollers 26, 26' may, for example, act on the lower strand of the respective belt conveyor 24. In the region of the friction rollers 26, a counter pressure means, for example a counter pressure roller 27, may be arranged on the inside in the winding region of the belt conveyor 24.

The friction rollers 26, 26' may be driven via a drive wheel 32. In this case, the rotational movement of the drive wheel 32 may be transferred to the friction rollers 26, 26' via a gear mechanism. Such a gear mechanism may be configured, for example, as a bevel gear mechanism 30, which has a drive shaft 31 protruding towards the side facing away from the belt conveyor 24 of the respective transport unit 18, on which the drive wheel 32 is received fixedly in terms of rotation.

Such a bevel gear mechanism 30 may be received in the respective carriage 22 of the transport unit 18 and comprise a bevel gear 33 which is located on the aforementioned drive shaft 31 and which cooperates with a bevel pinion 35. The bevel pinion 35 may be connected fixedly in terms of rotation to an output shaft 34 to which one or more friction rollers 26, 26' are fastened.

Each ejection station 12 of the sorting line 11 may be assigned an actuating unit 50. The actuating unit 50 may comprise one or more flaps 80, 80' with drive components 81, 81', which may be displaced between a resting position and a drive position so that the respective drive component 81, 81' is able to be brought in the respective working position into contact with the drive wheel 32 moving past the actuating unit 50.

In the embodiment of the sorting device 10 shown in FIGS. 1 to 5, the actuating units 50 comprise two drive components 81, 81' which in the embodiment shown are configured as friction strips and are arranged parallel to the longitudinal direction of the sorting line 11 and which may optionally be pivoted into the respective working position so that they may be brought into contact in a frictional connection with the drive wheel 32 moving past said friction strips.

Figure 3:
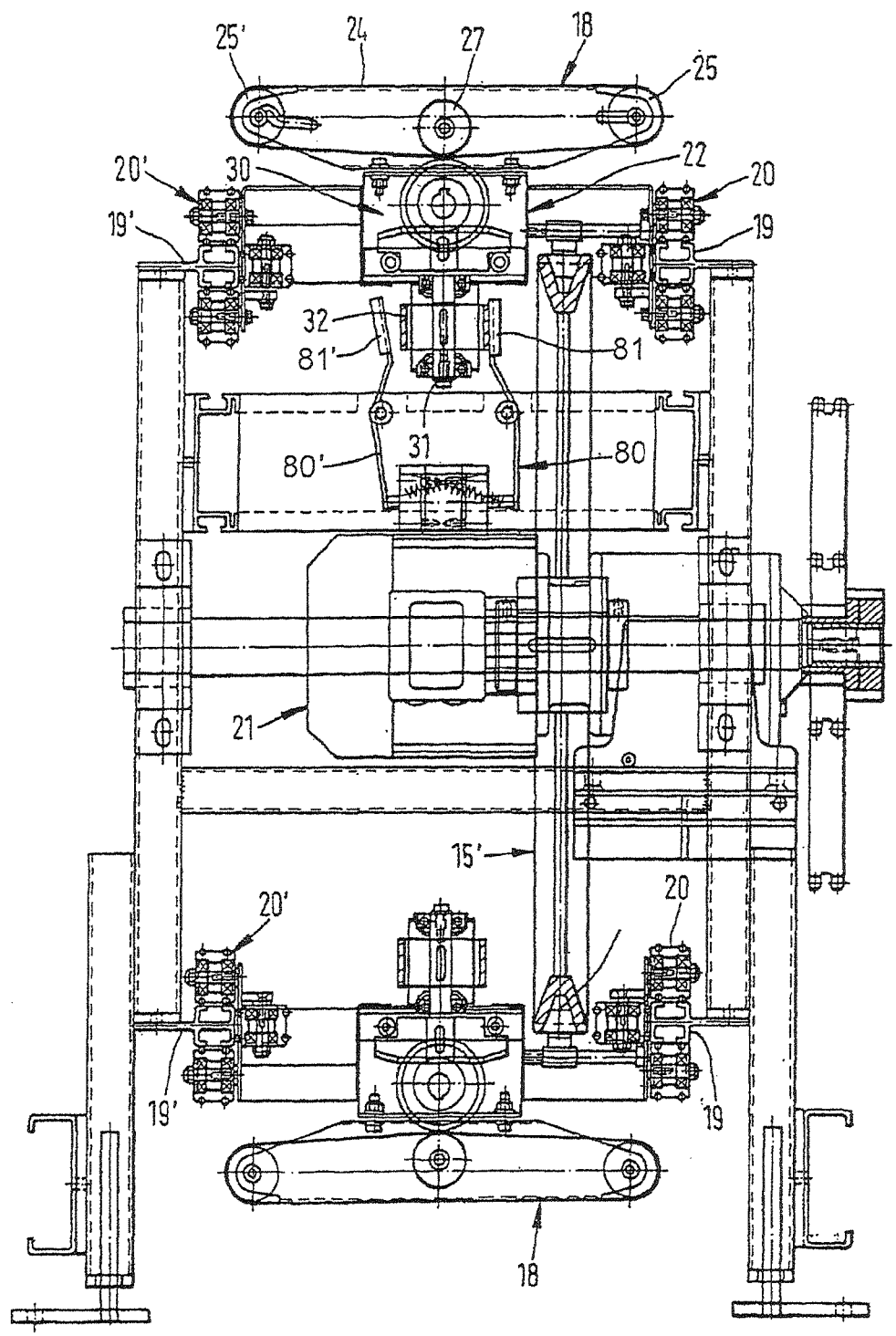
FIG. 3 shows a cross section through the sorting device corresponding to the cutting line III-III in FIG. 2.
Figure 4:
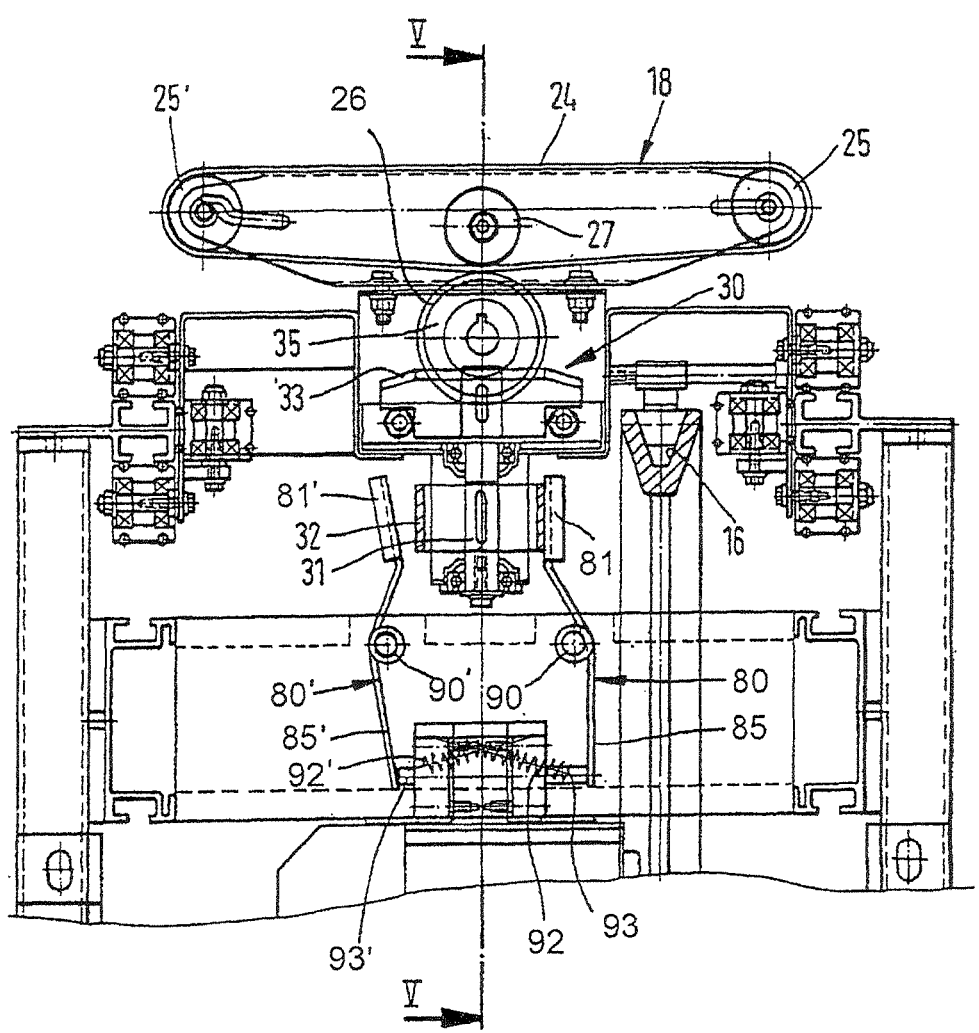
FIG. 4 shows in an enlarged detail of FIG. 3 a transport unit guided along the sorting line with a belt conveyor which is able to be driven transversely to the longitudinal extent of the sorting line and the means for selectively driving said belt conveyor.
Figure 5:
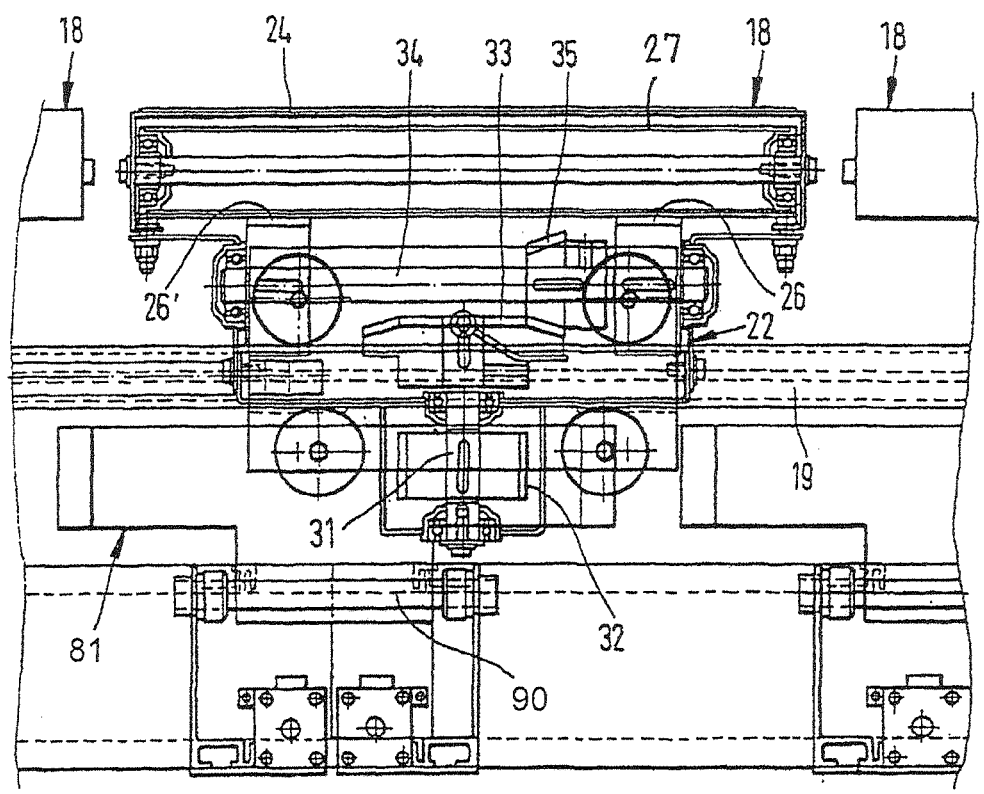
FIG. 5 shows a longitudinal section through the transport unit corresponding to the cutting line V-V in FIG. 4.

The friction strips are arranged in each case on flaps 80, 80' which in the embodiment shown in FIGS. 3 and 4 may also be denoted as double guide rods. The double guide rods are pivotably arranged via axle elements 90, 90' such that respectively one friction strip on one side or the other friction strip on the other side may optionally be brought to bear against the aforementioned drive wheel 32.

The double guide rods bearing the friction strips have lever arms 85, 85' protruding on the side of the axle elements 90, 90' remote from the respective friction strip. In the embodiment shown in FIG. 4, spring means 92, 92' are fastened to the lever arms 85, 85', said spring means subjecting the lever arms 85, 85' to a force which pivots the friction strips into the resting position. Moreover, actuating means 93, 93' acting pneumatically, hydraulically or electromagnetically are provided for pivoting the friction strips into their drive position. In other embodiments, the spring means may be dispensed with or merely one spring means which is arranged between the flaps 80, 80' may be provided. In the case of the double guide rod, such an individual spring means may be arranged on the lower lever arms which are pulled together via the spring means, so that the drive components 81, 81' arranged on the other side of the axle elements 90, 90' are forced apart. If no spring means are provided, the actuating means 93, 93' may be designed so that they are able to displace the flaps 80, 80' both into the resting position and into the working position. Such actuating means 93, 93' may, for example, be configured by dual-acting pneumatic cylinders. Alternatively, two separate pneumatic cylinders may be provided.

In the operating position shown in FIGS. 3 and 4, the friction strip to the right in the drawings bears against the drive wheel 32 received on the drive shaft 31 of the bevel gear mechanism 30. Said right-hand friction strip is thus in its drive position. If a transport unit 18 is moved by means of the V-belt 16 of the conveying device 14 in the region of the relevant ejection station 12 along the sorting line, the drive wheel 32 and the friction strip bearing thereagainst cooperate by a frictional connection and the rotational movement of the drive shaft 31 of the bevel gear mechanism 30 produced thereby is transmitted via the friction rollers 26, 26' to the belt conveyor 24 so that the belt conveyor 24 circulates in the corresponding direction.

A belt conveyor drive in the opposing direction is present when the left-hand friction strip shown in FIGS. 3 and 4 is pivoted into the working position and is brought into contact with the aforementioned drive wheel 32.

During use of the sorting device 10, articles 44 may be supplied at the start of the sorting line 11, for example by means of a feeding station 42, as indicated in FIG. 1 by the arrows 45. In this case, for example one respective article 44 may be fed onto one of the transport units 18, which are moved by means of the conveying device 14 in the direction of the arrow 46 along the sorting line 11.

The articles 44 may be provided with a coding which is detected when an article 44 is fed onto a specific transport unit 18. Depending on this coding, the friction strip of the ejection station 12 onto which the relevant article is intended to be ejected may be actuated into the drive position thereof, for example by means of a control device, not shown. Other types of control are also conceivable.

With regard to the paired arrangement of the friction strips at each ejection station 12 and the optional actuation in each case of a friction strip into its drive position, a right-handed or left-handed ejection of the articles into one of the ejection slides 13, 13' arranged on both sides of the sorting line may optionally be implemented. It is also conceivable that in each case ejection slides and drive components are only provided on one side.

The drive wheels and drive components may be designed to produce different acceleration and/or speeds of the driven belt conveyor 24. Instead of a frictional connection, a positive connection may also be provided between the drive wheels and drive components for transmitting the drive movement. Relative to these options for the design of the drive components and the corresponding drive wheels, reference is made to the relevant embodiments in EP 0 930 248 B1, the contents thereof being incorporated into the present application. These embodiments also apply to the embodiment described hereinafter.

A further embodiment of the sorting device 10 is described with reference to FIGS. 6 to 9*b*. In order to avoid repetition, only the components of the sorting device which differ from the embodiments described above are disclosed. Particular attention is drawn to the actuating unit 50, shown in detail in the figures.

Figure 6:
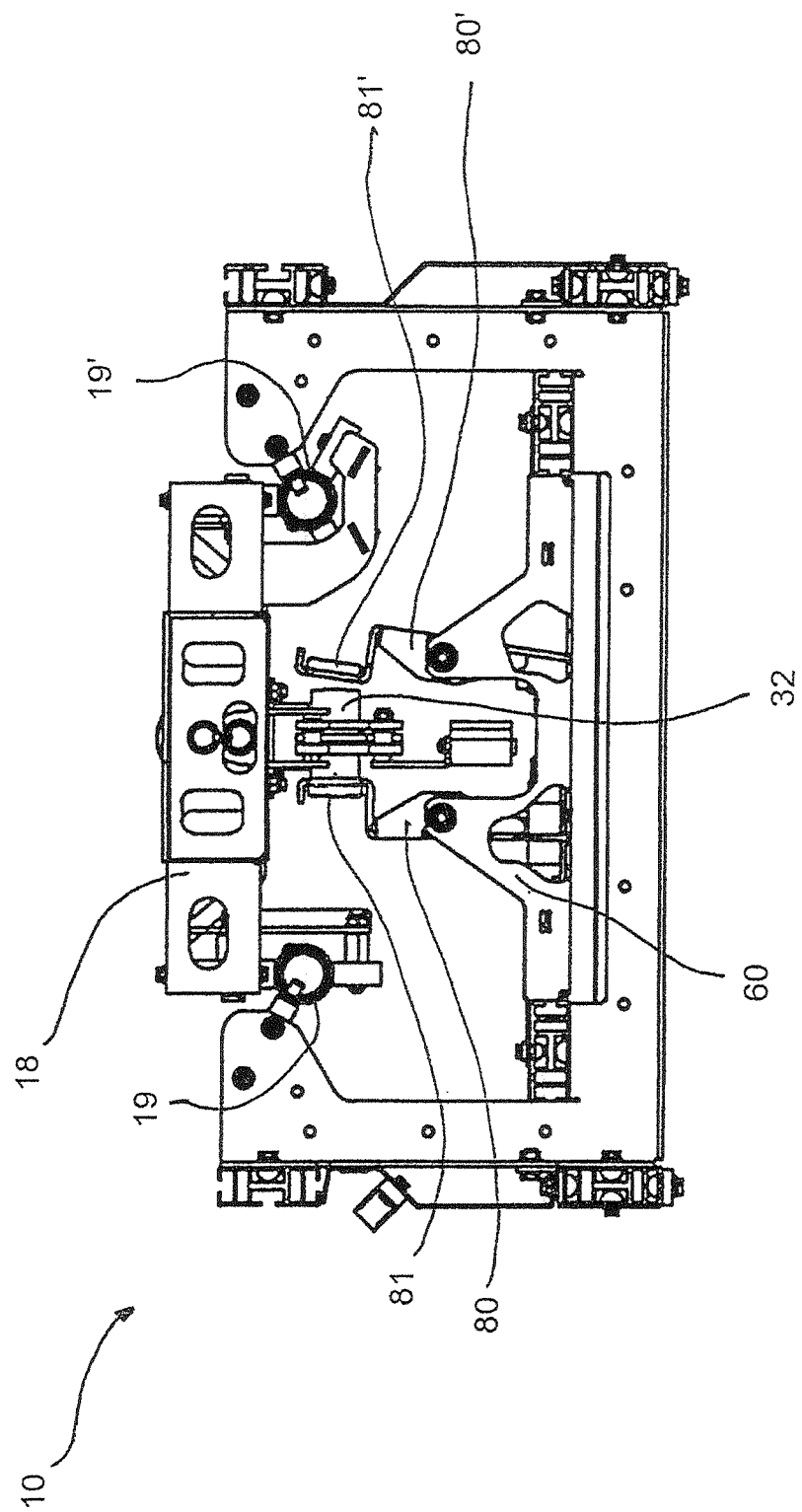
FIG. 6 shows a second embodiment of a sorting device in a sectional side view which corresponds to the view of the first embodiment of FIG. 4.

FIG. 6 shows a second embodiment of a sorting device 10 in a sectional side view which corresponds to the view of the first embodiment of FIG. 4.

The sorting device 10 shown comprises a transport unit 18 which is movably guided on guide rails 19, 19'. The guidance differs from the guidance described above of the first embodiment. In this case, the guide rails 19, 19' have a round cross section. On the guide rail shown to the right in FIG. 6, the transport unit 18 is guided via three rollers which are arranged at an angle of ca. 120° around the guide rail 19'. The transport unit 18 is specifically guided in a vertical and horizontal manner via said three rollers. On the guide rail 19 shown to the left in FIG. 6, the transport unit 18 is only guided vertically via two rollers, which are arranged on opposing sides of the guide rail 19. Via this bearing arrangement, over-determination and thus jamming of the transport unit 18 is avoided.

A drive wheel 32 is shown at the bottom of the transport unit 18, said drive wheel being in contact with a drive component 81 of a flap 80. When moving the transport unit 18 on the guide rail, in this working position of the flap 80 a frictional force may be transmitted from the drive component 81 to the drive wheel 32. The opposing flap 80' is located in a resting position in which the drive component 81' is arranged displaced away from the drive wheel 32.

The flaps 80, 80' shown are displaceably received in a flap holder 60 which is described hereinafter in detail.

Figure 7A:
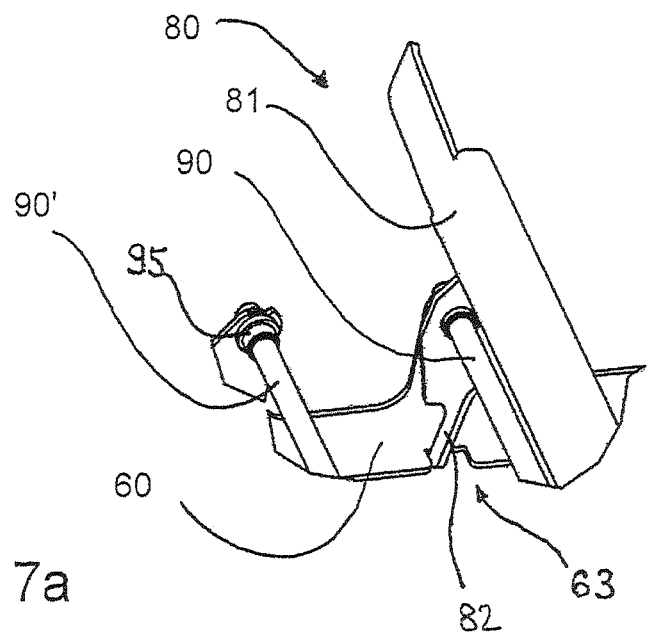
FIG. 7a shows a perspective partial view of an actuating unit.
Figure 7B:
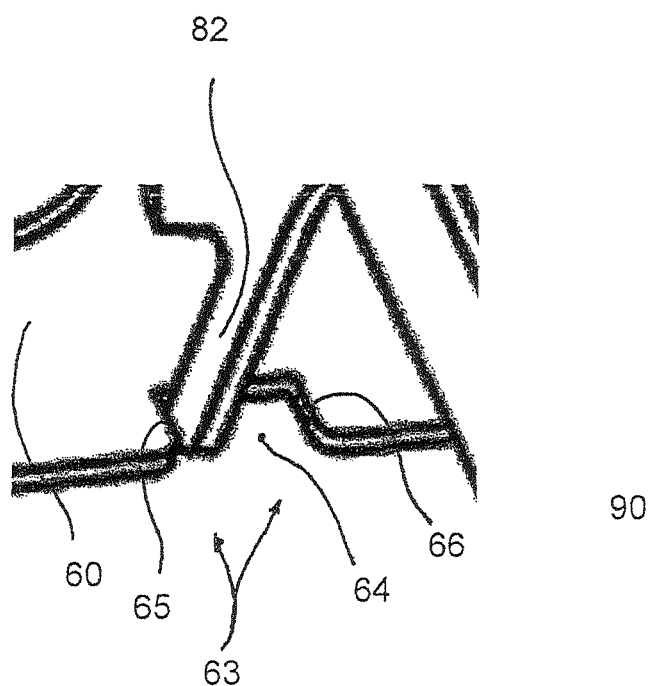
Figure 8A:
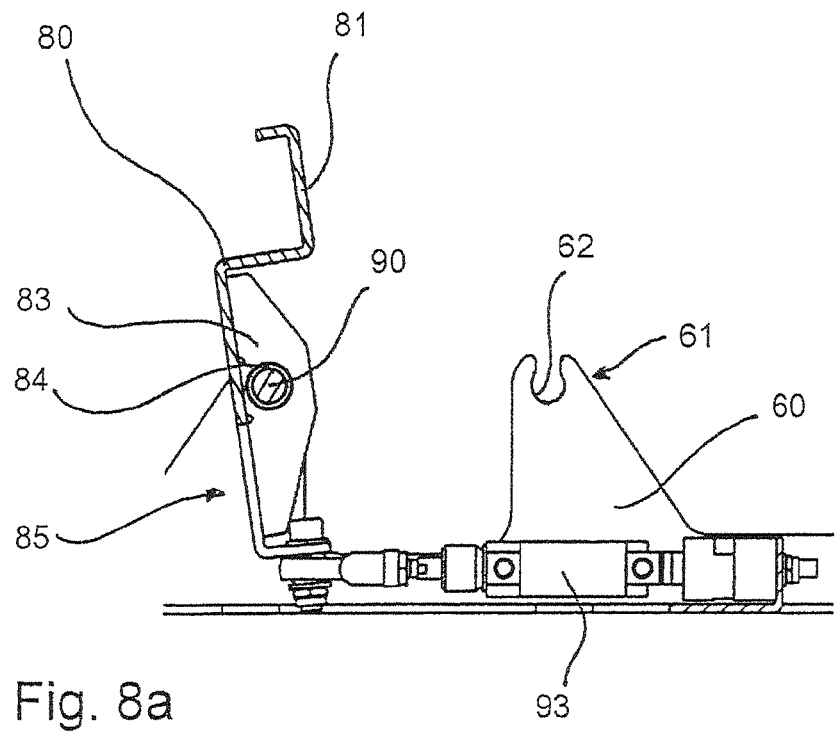
FIG. 8a shows a sectional partial view of the actuating unit.

FIG. 7*a* shows a perspective partial view of the actuating unit 50, FIG. 7*b* shows an enlarged partial view of FIG. 7*a* and FIG. 8*a* shows a sectional partial view of the actuating unit 50.

The flap 80 is shown in the partial view in FIGS. 7*a* and 7*b*, said flap being pivotably mounted in the flap holder via an axle element 90. The adjacent axle element 90' is shown without the flap fastened thereto. The drive component 81 is shown on the flap 80 in the upper region. In the form shown, the flap 80 is in its resting position.

At its end which is arranged on the side remote from the drive component 81 relative to the axle element 90, the flap 80 has a movement limiting component 82 which is configured as an elongate tongue-shaped projection. The movement limiting component 82 is in contact with a corresponding movement limiting element 63 of the flap holder 60. As is shown in the enlarged view in FIG. 7*b*, the movement limiting component 63 is formed by a recess 64, which is limited by a first edge region 65 and a second edge region 66. The two edge regions 65, 66 limit the possible displacement movement of the flap 80. In the resting position shown, the movement limiting component 82 comes into contact with the first edge region 65 and thus is not able to pivot beyond the resting position. If the flap 80 is pivoted into the drive position, the contact of the movement limiting component 82 with the second edge region 66 prevents a displacement of the flap 80 beyond the working position.

In FIG. 8a a flap 80 is shown mounted in the flap holder 60, said flap being inserted into a bearing via an axle element 90. Via the axle element 90, the flap 80 is pivotably mounted in the flap holder 60. The opposing bearing 61 is shown uncovered without the flap mounted therein. The bearing 61 has a U-shaped recess into which a second axle element of a second flap may be inserted.

Figure 8B:
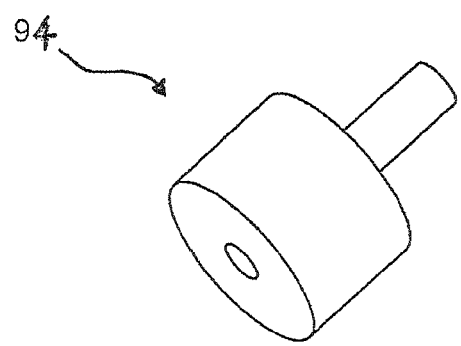
FIG. 8b shows a damping element.

The flap 80 has a lever arm 85 which is connected in an articulated manner to an actuating means 93. The actuating means 93 in the embodiment shown is configured as a dual-acting pneumatic cylinder which is able to displace the flap 80 both into the resting position and into the drive position. A damping element 94 is arranged on the side of the actuating means 93 opposing the flap 80, via which the actuating means 93 is fastened to the flap holder 60. FIG. 8b shows the damping element 94 in detail. The damping element 94 may be produced from a resilient plastics material, for example from rubber. The damping element 94 may have on one side a threaded bolt via which the damping element 94 may be screwed to the flap holder 60. On the side opposing the threaded bolt, the damping element 94 may have a recess via which the damping element 94 is able to be connected to the actuating means 93.

The resilient material serves to dampen impacts transmitted via the flap 80 to the actuating means 93, so that noise emissions and the loading of the actuating means 93 may be reduced. Moreover, via the resilient connection of the actuating means 93 via the damping element 94 to the flap holder 60 a type of articulated bearing arrangement may be produced so that the actuating means 93 may be pivoted to a small degree relative to the flap holder 60. In the embodiment shown, the amount by which the actuating means 93 is pivoted when displaced between the resting position and the working position relative to the flap holder 60 is approximately 1°.

Figure 9A:
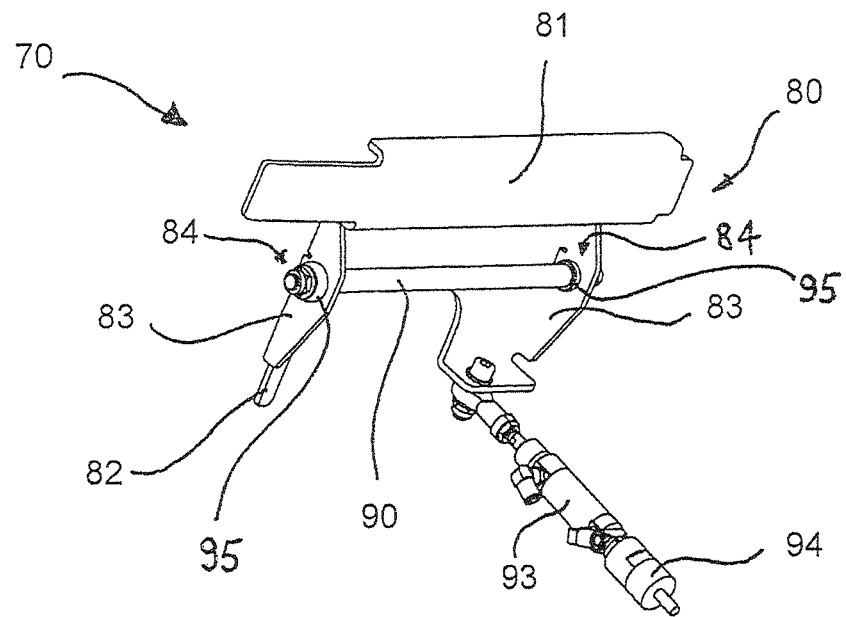
FIG. 9a shows a flap sub-assembly.

FIG. 9a shows a pre-assembled flap sub-assembly 70 with a flap 80, an axle element 90, an actuating means 93 and a damping element 94.

Here it may be seen that the flap has two tabs 83 bent-back at right angles, in which in each case a receiving hole 84 is arranged. In the receiving holes 84 in each case a bearing element 95 is provided for the rotatable mounting of the respective axle element 90, as shown in FIGS. 7a and 9a. In the embodiment shown, the bearing elements 95 are configured as plain bearings. Such plain bearings may, for example, be implemented by bronze bushings inserted into the receiving holes. Further embodiments are also conceivable. The axle element 90 is inserted through the bearing elements 95 located in the receiving holes 84 of the flap 80. The flap 80 is inserted via the axle element 90 into a bearing and pivotably arranged there. Moreover, it may be seen that the flap 80 is configured as a bent sheet metal part which is formed from a single piece of sheet metal.

Figure 9B:
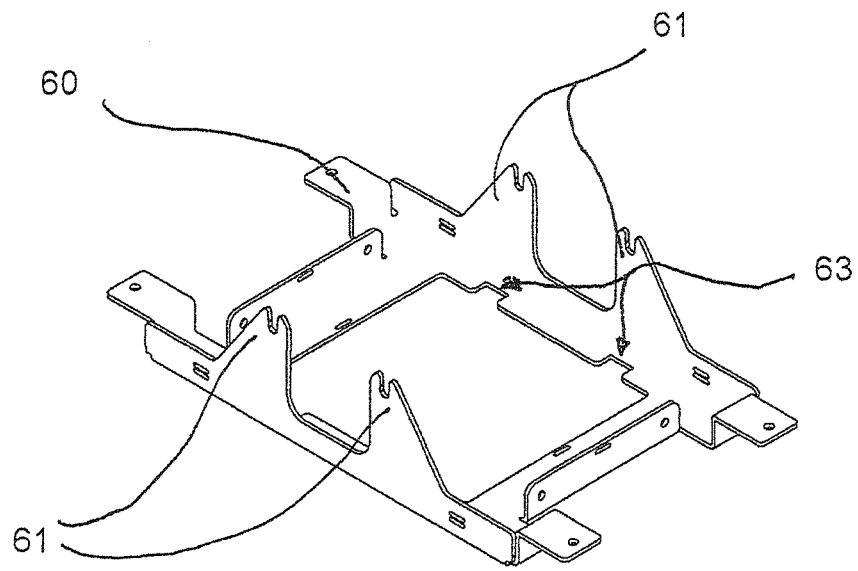
FIG. 9b shows a flap holder.

FIG. 9b shows the flap holder 60 with four bearings 61 and two movement limiting elements 63. It is also visible that the flap holder 60 is configured as a bent sheet metal part which is formed from a single piece of sheet metal.

During the mounting procedure, the flap holder 60 may be pre-mounted in the frame of the sorting device 10. Subsequently, the pre-assembled flap sub-assembly 70 may be inserted from above into the flap holder 60. For fixing the pre-assembled flap sub-assembly 70, for each flap sub-assembly 70 only two nuts on the ends of the axle element 90 and one nut on the damping element 94 have to be tightened in order to complete the mounting of the flap sub-assembly 70 in the flap holder.

The invention claimed is:

1. An actuating unit (50) for a sorting device (10) for sorting articles along an elongated sorting line, the sorting device having a conveying device and at least one transport unit formed with at least one belt conveyor, the transport unit being conveyed along a longitudinal direction of the sorting line by the conveying device, the actuating unit (50) comprising:
 a flap holder (60);
 at least one flap (80, 80') held in the flap holder and displaceable between a resting position and a drive position, the at least one flap having a drive component (81, 81') for transmitting a drive force to a drive wheel (32) of the at least one transport unit (18) to drive the at least one belt conveyor of the transport unit transversely to the longitudinal direction of the sorting line; and
 a movement limiting component (82) projecting from the flap (80, 80') and configured to engage a movement limiting recess (63), to limit displacement movement of the flap (80, 80') beyond the resting position and the drive position.

2. The actuating unit (50) of claim 1, both the drive component (81, 81') and the movement limiting component (82) being an integral component of the flap (80, 80').

3. The actuating unit (50) of claim 2, the flap (80, 80') being produced as a bent sheet metal part.

4. The actuating unit (50) of claim 1, the flap holder (60) being configured as a bent sheet metal part.

5. The actuating unit (50) of claim 4, the flap holder (60) having a recess (63) corresponding to the movement limiting component (82), and the movement limiting element (63) being formed by the recess (63).

6. The actuating unit (50) of claim 1, an axle element (90, 90') being fastened to the flap (80, 80'), and the flap (80, 80') being pivotably mounted via the axle element (90, 90') in the flap holder (60).

7. The actuating unit (50) of claim 6, the axle element (90, 90') being received in bearings (61) of the flap holder (60), at least one of the bearings (61) being formed by a U-shaped recess (62) which is open on one side.

8. The actuating unit (50) of claim 1, the actuating unit (50) also comprising an actuating means (93, 93') which is connected at a first end of the actuating means (93, 93') to the flap (80, 80') and which is connected at a second end of the actuating means (93, 93') to the flap holder (60), a damping element (94) being arranged between the first end of the actuating means (93, 93') and the flap (80, 80') and/or between the second end of the actuating means (93, 93') and the flap holder (60).

9. The actuating unit (50) of claim 8, the fastening of the actuating means (93, 93') via the damping element (94) providing an articulated connection which ensures a resilient pivoting of the actuating means (93, 93') relative to the flap (80, 80') or the flap holder (60).

10. A sorting device (10) having the actuating unit (50) of claim 1.

11. The sorting device (10) of claim 9, the U-shaped recesses (62) of the bearings (61) of the flap holder (60) being upwardly open in the mounted position of the flap holder (60) in the sorting device (10).

12. A method for mounting an actuating unit (50) of a sorting device, comprising the steps
- providing a flap holder (60) with upwardly open bearings (61),
- providing a pre-assembled flap sub-assembly (70) comprising a flap (80, 80'), an axle element (90, 90') and an actuating means (93, 93'),
- inserting the pre-assembled flap sub-assembly (70) into the flap holder (60), the axle element (90, 90') being inserted into the upwardly open bearings (61) and
- fixing the axle element (90, 90') into the upwardly open bearings (61) and fixing a damping element (94) to the flap holder (60).

13. A sorting device for sorting articles, the sorting device comprising:
- an elongated sorting line having at least one ejection station;
- at least one transport unit for transporting the articles, the at least one transport unit having at least one belt conveyor and a drive wheel configured to drive the at least one belt conveyor transversely to the longitudinal direction of the sorting line;
- a conveying device for conveying the at least one transport unit along a longitudinal direction of the elongated sorting line;
- at least one actuating unit coupled to the at least one ejection station, the at least one actuating unit comprising a flap holder, and at least one flap held in the flap holder and displaceable between a resting position and a drive position, the at least one flap having a drive component for transmitting a drive force to the drive wheel of the transport unit; and
- a movement limiting component projecting from the flap and configured to engage a movement limiting recess to limit displacement of the flap beyond the resting position and the drive position.

14. The sorting device of claim 13, wherein both the drive component and the movement limiting component are integral components of the flap.

15. The sorting device of claim 14, wherein the flap is a bent sheet metal part.

16. The sorting device of claim 13, wherein the flap holder being is a bent sheet metal part.

17. The sorting device of claim 13, further comprising an axle element fastened to the flap, wherein the flap is pivotably mounted via the axle element in the flap holder.

18. The sorting device of claim 17, wherein the axle element is received in bearings of the flap holder, and at least one of the bearings is formed by a U-shaped recess open on one side.

19. The sorting device of claim 1, wherein the actuating unit further comprises an actuating means having a first end connected to the flap and a second end connected to the flap holder, and a damping element arranged between one of the first end of the actuating means and the flap and the second end of the actuating means and the flap holder.

20. The sorting device of claim 19, wherein the fastening of the actuating means via the damping element provides an articulated connection which ensures a resilient pivoting of the actuating means relative to the flap or to the flap holder.

\* \* \* \* \*